United States Patent
Jojic et al.

(10) Patent No.: US 12,081,901 B2
(45) Date of Patent: Sep. 3, 2024

(54) IMAGE MODIFICATION BASED ON TEXT RECOGNITION

(71) Applicant: Comcast Cable Communications, LLC, Philadelphia, PA (US)

(72) Inventors: Oliver Jojic, Annandale, VA (US); David F. Houghton, Brattleboro, VT (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/407,500

(22) Filed: Aug. 20, 2021

(65) Prior Publication Data

US 2022/0070405 A1 Mar. 3, 2022

Related U.S. Application Data

(63) Continuation of application No. 16/555,743, filed on Aug. 29, 2019, now Pat. No. 11,134,214, which is a
(Continued)

(51) Int. Cl.
| | |
|---|---|
| *H04N 5/445* | (2011.01) |
| *G06V 20/62* | (2022.01) |
| *G11B 27/034* | (2006.01) |
| *G11B 27/036* | (2006.01) |
| *H04N 5/76* | (2006.01) |
| *H04N 21/431* | (2011.01) |

(Continued)

(52) U.S. Cl.
CPC ........... *H04N 5/445* (2013.01); *G06V 20/635* (2022.01); *H04N 5/76* (2013.01); *H04N 21/4316* (2013.01); *H04N 21/4334* (2013.01); *H04N 21/44008* (2013.01); *H04N 21/4583* (2013.01); *H04N 21/47214* (2013.01); *H04N 21/488* (2013.01); *H04N 21/812* (2013.01); *G11B 27/034* (2013.01); *G11B 27/036* (2013.01)

(58) Field of Classification Search
CPC ...... H04N 5/445; H04N 5/76; H04N 21/4316; H04N 21/4334; H04N 21/44008; H04N 21/4583; H04N 21/47214; H04N 21/488; H04N 21/812; G06V 20/635; G11B 27/034; G11B 27/036
USPC ........... 382/190, 176; 348/468, 700; 725/39; 386/241

See application file for complete search history.

(56) References Cited

U.S. PATENT DOCUMENTS

| | | | |
|---|---|---|---|
| 6,470,094 B1 | 10/2002 | Lienhart et al. | |
| 6,608,930 B1 * | 8/2003 | Agnihotri | G06F 16/78 382/176 |

(Continued)

FOREIGN PATENT DOCUMENTS

WO 2010079559 A1 7/2010

OTHER PUBLICATIONS

Unofficial translation of WO2010/079559.
(Continued)

*Primary Examiner* — Kathleen Y Dulaney
(74) *Attorney, Agent, or Firm* — Banner & Witcoff, Ltd.

(57) ABSTRACT

A text detection process may involve comparing high-contrast pixel densities of areas of images of a video to determine quantities of text-containing areas in the images. Based on a difference between quantities of text-containing areas of subsets of the images, an image of the video may be selected for modification.

52 Claims, 10 Drawing Sheets

Related U.S. Application Data continuation of application No. 15/808,443, filed on Nov. 9, 2017, now Pat. No. 10,440,305, which is a continuation of application No. 14/625,981, filed on Feb. 19, 2015, now Pat. No. 9,843,759, which is a continuation of application No. 12/908,048, filed on Oct. 20, 2010, now Pat. No. 8,989,499.

(51) Int. Cl.

| | | |
|---|---|---|
| *H04N 21/433* | (2011.01) | |
| *H04N 21/44* | (2011.01) | |
| *H04N 21/458* | (2011.01) | |
| *H04N 21/472* | (2011.01) | |
| *H04N 21/488* | (2011.01) | |
| *H04N 21/81* | (2011.01) | |

(56) References Cited

U.S. PATENT DOCUMENTS

| | | | |
|---|---|---|---|
| 6,771,885 B1 | 8/2004 | Agnihotri et al. | |
| 6,778,700 B2 | 8/2004 | Karidi et al. | |
| 6,853,755 B2 | 2/2005 | Li | |
| 7,082,219 B2 | 7/2006 | Bourbakis et al. | |
| 7,450,268 B2* | 11/2008 | Martinez | B41J 29/393 |
| | | | 358/1.9 |
| 7,583,888 B2 | 9/2009 | Keda et al. | |
| 7,747,086 B1* | 6/2010 | Hobbs | G06T 9/004 |
| | | | 382/233 |
| 8,045,802 B2 | 10/2011 | Blinnikka | |
| 8,189,917 B2 | 5/2012 | Campbell | |
| 8,340,498 B1* | 12/2012 | Gill | G11B 27/105 |
| | | | 386/245 |
| 8,442,311 B1* | 5/2013 | Hobbs | G06T 9/00 |
| | | | 382/166 |
| 8,953,891 B1 | 2/2015 | Hundemer et al. | |
| 9,043,828 B1* | 5/2015 | Jing | G06Q 30/0241 |
| | | | 725/35 |
| 9,554,093 B2* | 1/2017 | Hua | H04N 21/812 |
| 2002/0069218 A1* | 6/2002 | Sull | G11B 27/105 |
| | | | 715/201 |
| 2002/0085116 A1 | 7/2002 | Kuwano et al. | |
| 2002/0168105 A1 | 11/2002 | Li | |
| 2002/0188945 A1 | 12/2002 | McGee et al. | |
| 2004/0096002 A1* | 5/2004 | Zdepski | H04N 19/17 |
| | | | 375/E7.199 |
| 2005/0137958 A1* | 6/2005 | Huber | G06Q 30/02 |
| | | | 705/37 |
| 2005/0196043 A1* | 9/2005 | Jung | G06V 20/62 |
| | | | 382/176 |
| 2006/0008147 A1* | 1/2006 | Jung | G06V 30/1444 |
| | | | 382/176 |
| 2007/0079322 A1* | 4/2007 | Sloo | H04N 21/44008 |
| | | | 725/19 |
| 2007/0086669 A1* | 4/2007 | Berger | G06V 10/235 |
| | | | 382/243 |
| 2007/0127815 A1 | 6/2007 | Karidi et al. | |
| 2007/0165950 A1 | 7/2007 | Nishida | |
| 2007/0189717 A1* | 8/2007 | Yun | H04N 21/440263 |
| | | | 386/230 |
| 2007/0292027 A1 | 12/2007 | Jung et al. | |
| 2008/0134251 A1 | 6/2008 | Blinnikka | |
| 2008/0138030 A1* | 6/2008 | Bryan | H04N 21/4221 |
| | | | 348/E5.103 |
| 2009/0022472 A1 | 1/2009 | Bronstein et al. | |
| 2009/0043725 A1* | 2/2009 | Gutta | H04N 21/44008 |
| | | | 706/54 |
| 2009/0077046 A1 | 3/2009 | Narahara et al. | |
| 2009/0125510 A1 | 5/2009 | Graham et al. | |
| 2010/0014579 A1* | 1/2010 | Hou | H04N 19/51 |
| | | | 375/E7.076 |
| 2010/0034509 A1 | 2/2010 | Dodd | |
| 2010/0061635 A1 | 3/2010 | Ihara | |
| 2010/0067865 A1* | 3/2010 | Saxena | G06T 7/246 |
| | | | 386/278 |
| 2010/0074526 A1 | 3/2010 | Campbell | |
| 2010/0122286 A1* | 5/2010 | Begeja | G06Q 30/02 |
| | | | 725/34 |
| 2010/0157340 A1* | 6/2010 | Chen | G06V 30/413 |
| | | | 358/1.9 |
| 2011/0025719 A1 | 2/2011 | Yanase | |
| 2011/0211812 A1 | 9/2011 | Tzoukermann et al. | |
| 2012/0019717 A1* | 1/2012 | Mase | G11B 27/28 |
| | | | 348/468 |

OTHER PUBLICATIONS

Foreign Office Action—European Application 11 185 705.8—dated Feb. 2, 2015.
European Search Report EP 11185705, dated Jan. 19, 2012.
EP Response to Office Action—EP Appl. 11185705.8—Submitted Jul. 21, 2015.
Mar. 10, 2017—European Office Action—EP 11185705.8.
Aug. 18, 2017—Canadian Office Action—CA 2,755,538.
Jul. 5, 2018—Canadian Office Action—CA 2,755,538.
Sep. 25, 2018—European Office Action—EP 11185705.8.
Apr. 16, 2019—Canadian Office Action—CA 2,755,538.
Mar. 17, 2020—Canadian Office Action—CA 2,755,538.
Jun. 22, 2021—Canadian Office Action—CA 2,755,538.

\* cited by examiner

IMAGE MODIFICATION BASED ON TEXT RECOGNITION

CROSS-REFERENCE TO RELATED APPLICATIONS

This application is a continuation of U.S. patent application Ser. No. 16/555,743, filed Aug. 29, 2019, which is a continuation of U.S. patent application Ser. No. 15/808,443, filed Nov. 9, 2017 (now U.S. Pat. No. 10,440,305), which is a continuation of U.S. patent application Ser. No. 14/625,981, filed Feb. 19, 2015 (now U.S. Pat. No. 9,843,759), which is a continuation of U.S. patent application Ser. No. 12/908,048, filed Oct. 20, 2010 (now U.S. Pat. No. 8,989,499), each of which is incorporated by reference herein as to its entirety.

BACKGROUND

Schedules for television and other video programming may often be unpredictable due to various circumstances. For example, a sporting event may run past an expected or scheduled end time due to extra innings in a baseball game, overtime in basketball, football or hockey, and the like. Similarly, other types of programming such as movies or news may also exceed a predefined end time due, for example, to previous shows or content deviating from their schedule, resulting in a cascade effect. Accordingly, if a user has defined a recording for a program based on predefined scheduling information (e.g., in an electronic programming guide) and the program extends passed the scheduled end time, the recording of the program might not be complete.

BRIEF SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

Aspects of the present disclosure relate to systems and methods for detecting a beginning of a credit roll of a video program within a video stream. For example, detection of the beginning of a credit roll may be performed by extracting a plurality of frames and analyzing each frame to identify text blocks within those frames. Since a credit roll may include more text for a longer duration than in other content frames (e.g., scenes of a movie, sporting event, news broadcast, etc.), the number of text blocks in the video frames and a pattern thereof may allow detection of a transition point. Accordingly, the number of text blocks may be counted for each frame and placed in a sequence according to the chronological order of the frames. A wavelet may then be applied to the sequence of numbers to identify a point within the plurality of frames where a greatest difference exists between the number of text blocks detected in a first set of frames chronologically prior to the identified point and the number of text blocks detected in a second set of frames chronologically after the identified point. The point of greatest difference may be identified as the starting point of the credit roll.

According to another aspect, identifying text blocks within a frame may be performed by defining a text analysis window size and partitioning the frame based on the defined text analysis window size. The highest contrast exhibited by a pixel within each partition or segment may be identified and compared against a threshold contrast value. If the highest contrast meets or exceeds the threshold value, the corresponding partition or segment may be recorded. Those partitions that do not include a pixel having a contrast that meets or exceeds the threshold contrast value may be discarded or not recorded. Subsequently, contiguous recorded partitions may be merged into single text blocks. The blocks may then be filtered to remove false positives such as noise and images that might have high contrasts. For example, the filter may remove any blocks that are not of a predefined threshold size (e.g., a certain number of pixels high and/or wide) and blocks that do not have a sufficient high contrast pixel density. In the latter case, the system may determine the number of pixels within the block having a contrast exceeding the threshold contrast and calculate a density therefrom. If the density does not meet or exceed a particular density threshold, the block may be discarded as a false positive.

According to another aspect, identifying the start of a credit roll may allow a system to automatically extend recordings if the credit roll has not been detected. Since the credit roll is typically located at the end of a video program, the credit roll may be a reliable indicator of when a program is about to end (or a substantive portion of the program has ended). In one example, frames may be extracted from a video stream upon detecting a current time matching a predefined amount of time prior to a scheduled end time of the program being recorded (e.g., 10 minutes before the scheduled end time). In one example, the extracted frames may comprise 2 frames per second of the most recently recorded 5 minutes, 10 minutes, 30 minutes or other time periods. The system may then determine if the start of the credit roll is detected based on a text block analysis. If not, the system may extend the recording end time by a predefined amount of time (e.g., 10 seconds, 20 seconds, 30 seconds, 2 minutes, 5 minutes, etc.) and continue to monitor for the start of the credit roll based on a subsequent set of frames. If the start of the credit roll is detected, the system may set (or reset) the recording end time to a predefined amount of time after the start of the credit roll. Alternatively, the system might not alter the current recording end time when the start of the credit roll is detected.

According to yet another aspect, video programs such as video on demand and other assets may be processed such that additional content and information may be automatically inserted into the credit roll portion. For example, advertisements, viewing recommendations, news, weather, games and the like may be inserted into areas of the credit roll that do not include text. In another example, the credit roll may be shrunk to a smaller size to allow for the placement of the additional content in the remaining display space.

The details of these and other embodiments of the present disclosure are set forth in the accompanying drawings and the description below. Other features and advantages of the disclosure will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
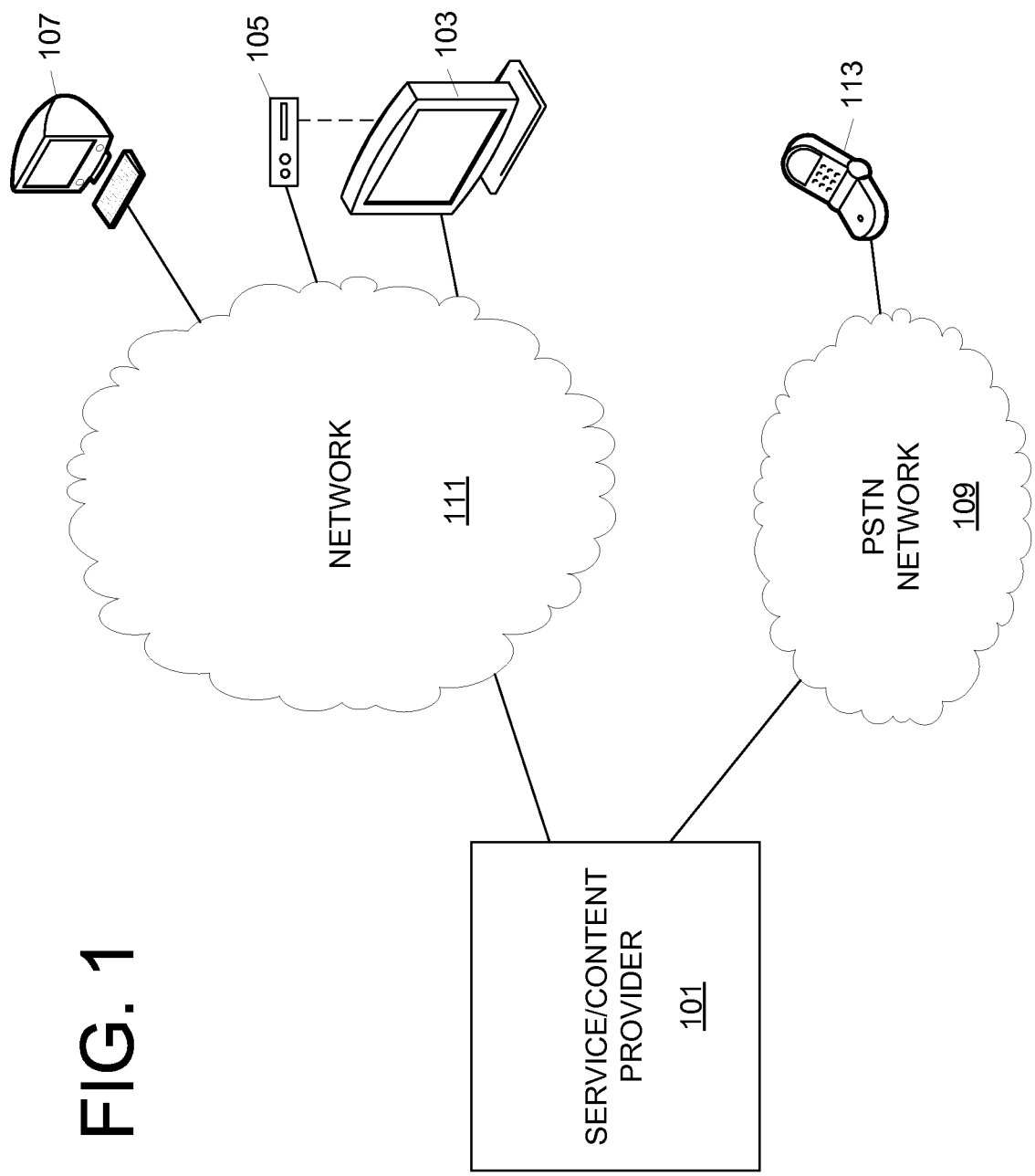
FIG. 1 illustrates an example content distribution network through which video programming and other content may be delivered.

FIG. 1 illustrates an example content distribution network that allows delivery of content from a service/content provider server 101 to one or more user systems such as a display 103, set top box 105 and computing system 107 (e.g., desktop or laptop computer, mobile device such as a smartphone, etc.). The distribution network may include multiple networks including a public switched telephone network (PSTN) 109, and digital networks 111, such as coaxial cable network, optical fiber network, a hybrid fiber/coax network, cellular telephone wireless network, local wireless (e.g., WiMAX), satellite, etc. In one or more arrangements, network 111 may support a digital voice network by digitizing voice communication and transmitting the data over lines of the network 111. A digital voice network may be supported by a coaxial cable network, a fiber optic cable network, a satellite network, or any other desired physical network architecture. In one or more configurations, content and services provided by the provider 101 might only be accessible to users with membership or a certain level of membership.

Network 111 and/or PSTN 109 may further support access to a data network including, for example, a wide area network (WAN) such as the Internet. In one example, PSTN 109 may allow a computing system to access the Internet through a dial-up modem. One or more portions of network 111 may be part of a private local area network (LAN). Alternatively or additionally, network 111 may include one or more logical networks that may be public or private. For example, a service provider such as a video or television content distributor may provide a private logical content network that only allows subscribers (e.g., clients 103, 105 and 107) to receive and/or consume the content distributed therethrough. The content transmitted through the private logical network might also be encrypted according to an encryption protocol that only members of the logical network is configured to understand. The private logical content network may be defined by multiple network addresses corresponding to the members of the network (e.g., clients 103, 105 and 107 and service provider server 101). Alternatively or additionally, a user may place orders for content or communicate other information to service provider 101 using a communication device such as mobile phone 113.

Figure 2:
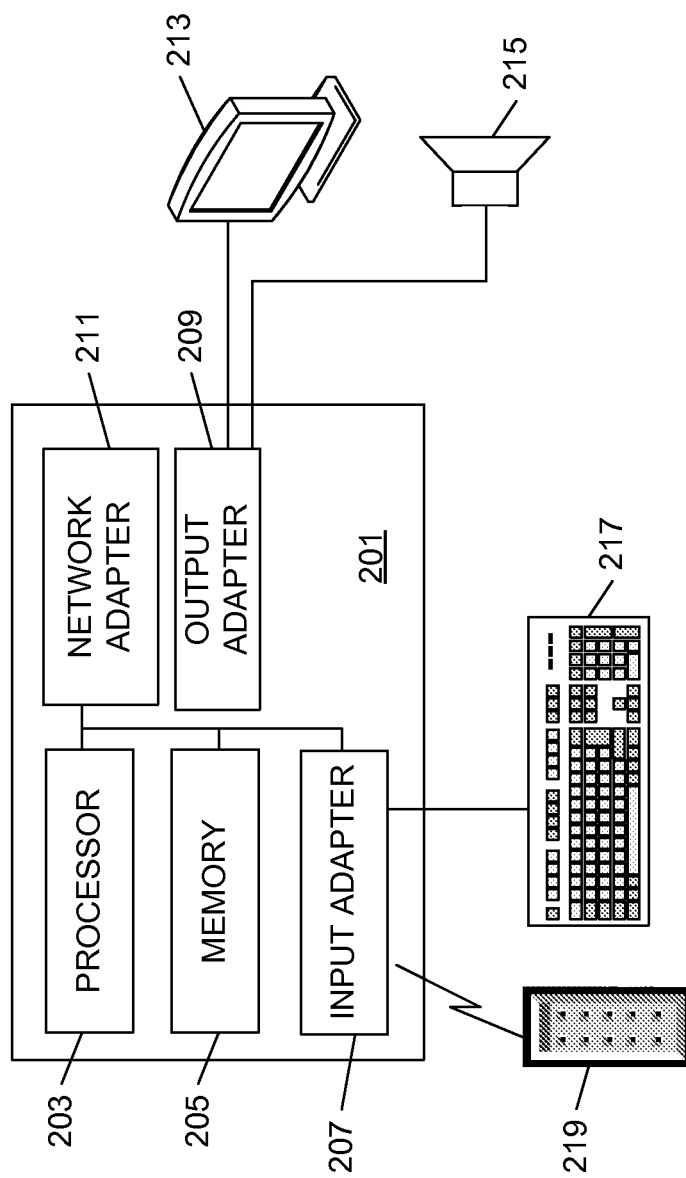
FIG. 2 illustrates an example computing system that may be used to implement one or more aspects described herein.

FIG. 2 illustrates a computing system 201 that may be used to implement various aspects of the disclosure. For example, computing system 201 may be used to identify a transition between video portions having little to no text and video portions having more substantial amounts of text, as discussed below. For example, computing system 201 may be used to determine the beginning of a credit roll at the end or another portion of a video program in a video content stream. Computing system 201 may be included at a central facility of provider 101, and/or at clients 103, 105, 107 or 113 of FIG. 1, for instance. By identifying the beginning of a credit roll, as discussed in more detail below, computing system 201 may more accurately identify the end of the program. Such accuracy may improve the ability of a recording device, in one or more examples, to fully record a program if the program deviates from a predefined schedule (e.g., if a movie extends past an end time defined in an electronic programming guide (EPG)). Program deviations may occur due to a variety of causes including the late ending of a previous program, overtime in sporting event programming, other program overruns (e.g., Academy Award speeches running longer than the allotted time limit), service irregularities (e.g., disruptions in service) and the like. Since such events are typically unplanned, a user wishing to record a program may find that the recording prematurely ends. Additionally, the identification of the credit roll portion may allow the computing system 201 to add additional content information, such as recommendations for other programs, weather, news, advertisements and the like.

Computing system 201 may include a variety of firmware, software and hardware components including one or more processors 203, memory 205 (e.g., random access memory (RAM) and read-only memory (ROM)), input adapters 207, output adapters 209 and network adapter 211. Processor 203 may be configured to perform mathematical calculations and execute instructions stored in memory 205. Such calculations and instructions may include determining a level of contrast for each pixel in a video frame. In another example, processor 203 may be configured to execute instructions for identifying text blocks within a video frame, as further described herein. Memory 205, in addition to storing computer readable instructions, may further store content items such as video, audio and/or text, user profile information, service information and various other types of data. Memory 205 may include various types of storage including optical, magnetic and flash storage systems. Input adapters 207 may be configured to facilitate the reception and processing of data from one or more input devices such as a keyboard 217, a remote control 219, a video camera (not shown), a microphone (not shown), a motion sensing device (not shown) and the like. For example, input adapter 207 may be configured to receive and process input from a user specifying a program that the user wishes to record using remote control 219. The recordation instructions may subsequently be stored in memory 205. Output adapters 209, on the other hand, may be configured to facilitate the outputting of data to one or more output devices such as a display 213 (e.g., computer monitor, television) or other visual output device, speakers 215 or other audio output systems, tactile and/or haptic feedback systems (not shown) and the like. In one example, video content may be displayed to a television and/or to an external or internal mass storage recording device (not shown).

According to one aspect, computing system 201 may store programming and instructions that may be executed by processor 203 to identify the start of a credits portion in a video program. A credits or credit roll portion may, in one example, include a portion of a video program that displays all the entities that contributed to the production of that video program. The credit roll may list actors, producers, audio and visual editors, movie, television and/or music studios, and the like. The credit roll is generally included at the end of a video program and thus, may be particularly indicative of when a video program has ended. Accordingly, computing system 201 may insure that a video recording, for instance, is automatically extended to fully capture a video program by detecting the start of a credit roll. Once the computing system 201 detects the start of the credit roll, the computing system 201 may instruct a recording subsystem to end the recording a predefined amount of time (e.g., 2 minutes, 5 minutes, 10 minutes, etc.) after the detected credit roll start. Capturing the entire credit roll might not be as imperative as capturing the entirety of a substantive portion of the video program. In other examples, computing system 201 may be configured to perform other functions upon detection of the start of the credit roll. For example, computing system 201 may identify areas of the credit roll in which additional content such as recommendations, advertisements, news and the like may be inserted without overlaying or obscuring existing text.

Figure 3:
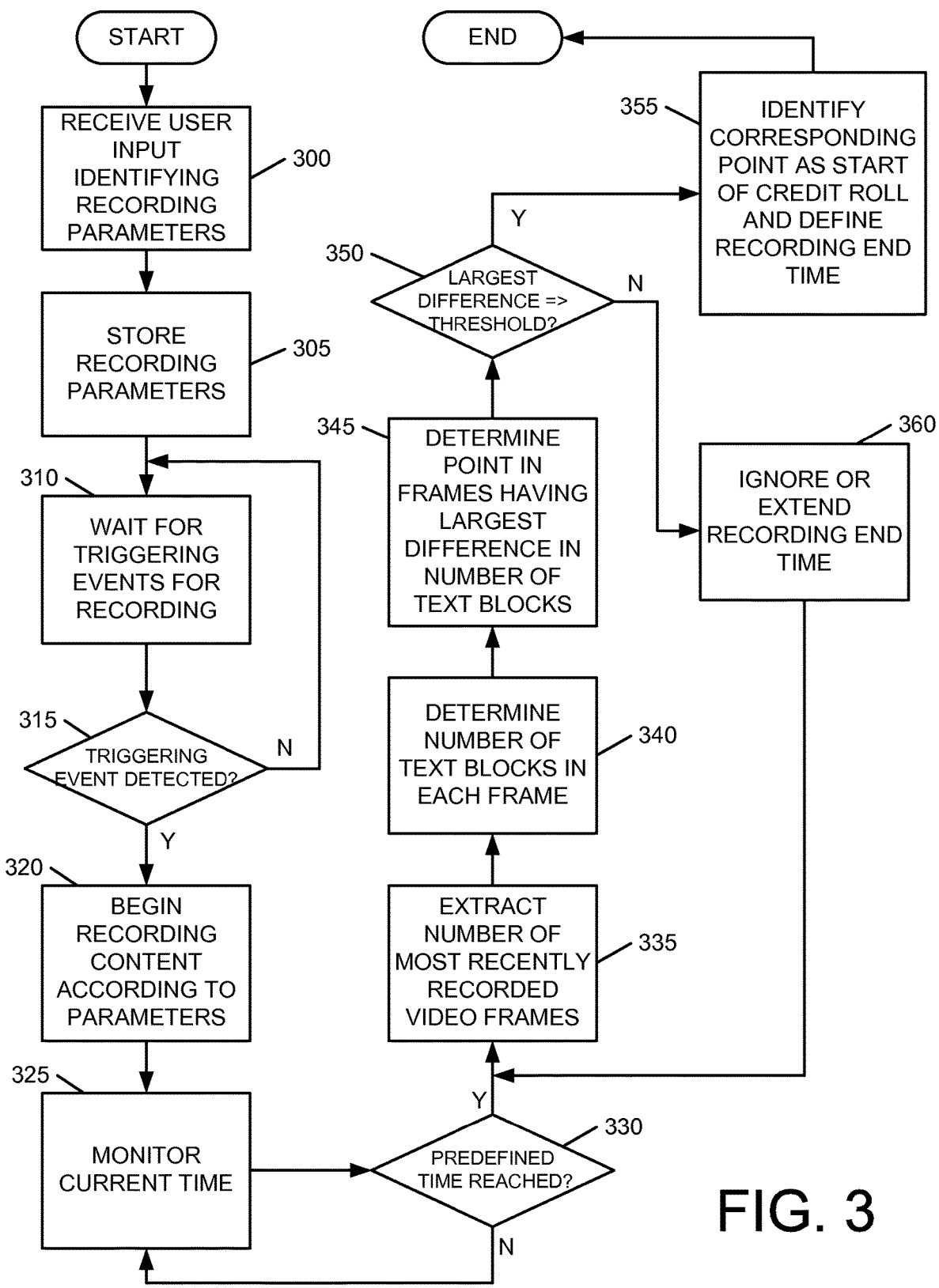
FIG. 3 illustrates an example method for automatically extending a video recording according to one or more aspects described herein.

FIG. 3 illustrates an example method by which a beginning of a credit roll may be detected in a video stream including a video program and by which a recordation may be automatically extended based thereon. In step 300, a recording system may receive user input identifying parameters for recording video content. The recording parameters may include, for example, a program name, a listing in an electronic programming guide (EPG), start and end times, a service or content source identifier, whether the recording is to be recurring or a one-time-only event and/or combinations thereof. In many of the aforementioned examples, the start time and end time of the recording may be determined based on a predefined schedule. In steps 305 and 310, the recording system may store the recording parameters and wait for appropriate triggering events, respectively. For example, the triggering event may include the occurrence of the specified start time. In step 315, the recording system may determine whether the triggering event has been detected. If not, the system may return to step 310 to continue monitoring for the triggering event. If, however, the recording system determines that the triggering event has been detected, the recording system may begin recording content according to the specified recording parameters (e.g., channel, program name, etc.) in step 320.

Once recording has begun, the computing system may monitor the current time in step 325 and determine whether the current time matches a predefined amount of time prior to the scheduled end time of the video program in step 330. For illustrative purposes, the predefined amount of time may be 10 minutes. In other examples, the predefined amount of time may be 1 minute, 2 minutes, 5 minutes, 15 minutes, 20 minutes, 30 minutes and the like. If the current time does not match the predefined amount of time prior to the scheduled end time, the computing system may return to monitoring the current time in step 325. If, however, the current time does match, the computing system may extract a number of most recently recorded video frames in step 335 (e.g., from a mass storage device of the recording system or a receiver buffer). In one example, the number of extracted video frames may be determined based on the use of 2 frames per second to extract frames for the last 5 minutes of recorded video (resulting in 600 extracted frames). In other examples, more or less frames may be extracted per second, or frames can be extracted to cover greater or less time depending, for example, on a speed at which text moves in the rolling credits.

Upon extracting the video frames, the computing system may subsequently determine a number of text blocks in each frame in step 340. A text block may include a contiguous or continuous region of text in a video frame. A text block may be defined in various manners based on allowable text block shapes and sizes and/or an amount of allowable space between characters of text (e.g., to still be considered within a single text block). An example method for identifying and determining a number of text blocks in a video frame is described in further detail below with respect to FIG. 5. A number of text blocks may be relevant in identifying a beginning of the credit roll since a credit roll generally includes significantly more text than a substantive portion of a video program. For example, a movie generally includes images of people or scenery with very little text whereas a credit roll is almost entirely comprised of text. Accordingly, identifying a transition between frames having smaller amounts of text and frames having greater amounts of text may correspond to identifying a transition from a substantive portion of a video program to a credit roll. Transitions may also be identified in a sequence of frames that progresses from frames having large amounts of text to frames having substantially less amounts of text.

In one arrangement, identifying the transition may include analyzing the text block information using a wavelet in step 345 to identify the point in the sequence of frames where the greatest difference exists between the left and right sides of the wavelet. A wavelet may include a mathematical function used to divide a given function or time signal into different scale components. Wavelets and the application thereof are further described below in FIGS. 4A and 4B. The maximum determined difference in number of text blocks in the extracted sequence of frames may subsequently be compared to a threshold difference amount in step 350. The threshold may be defined based on the radius or size of the wavelet used. For example, the threshold may be defined as 3 times the radius of the wavelet. Thus, in one specific example, if the wavelet has a radius of 15 seconds (i.e., 15 seconds of positive frames and 15 seconds of negative frames) and if the system counts text blocks once per second, then the threshold difference may be set as 45. If the maximum determined difference does not meet the threshold difference, the computing system (e.g., computing system 201 of FIG. 2) may return to step 335 to continue the analysis for another sequence of recorded frames. Additionally, the predefined end time for recording may be ignored and/or extended as shown in step 360. If the maximum determined difference meets or exceeds the threshold difference, the corresponding point in the recorded video stream may be identified as the beginning of the credit roll and the recording may be scheduled to end a specified amount of time after the start of the credit roll in step 355. For example, the computing system may schedule stoppage of the recording 1 minute, 2 minutes, 5 minutes or 10 minutes after a time corresponding to the beginning of the credit roll. The amount of recording time allotted after the beginning of the credit roll may depend on an expected duration of the credits, or a user's selection. The expected duration of the credits may vary and may be defined differently for different content types. For examples, movies may include longer credit rolls while television shows or sporting events may include shorter credit rolls. Alternatively, if the recording time is automatically extended each time the analysis does not detect the start of the credit roll, the recording time may be left unchanged upon detecting the start of the credit roll.

Figure 4A:
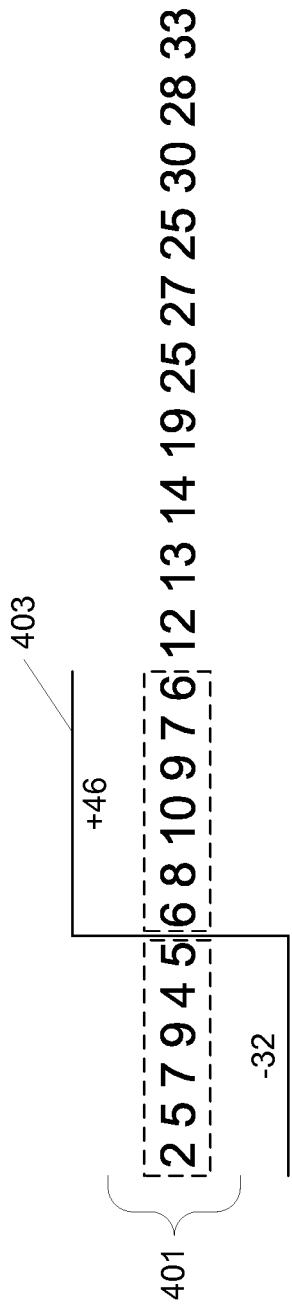
FIGS. 4A & 4B illustrate a process for identifying a transition between text-heavy video frames and non-text heavy video frames according to one or more aspects described herein.
Figure 4B:
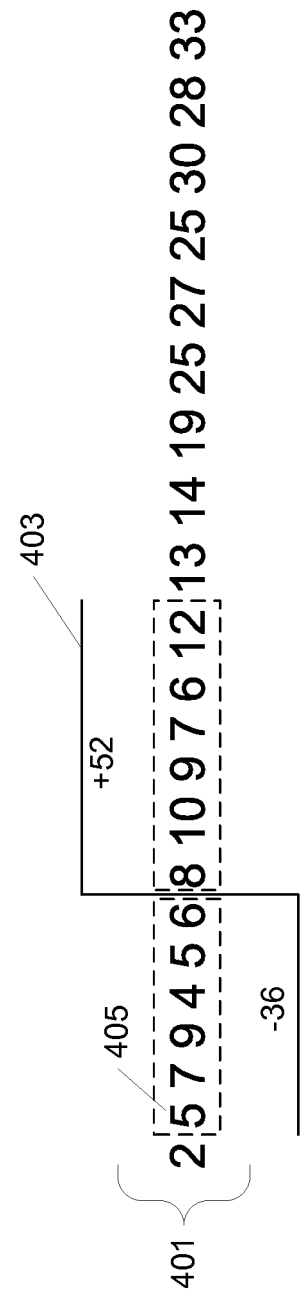

FIGS. 4A and 4B illustrate an example process whereby a wavelet analysis is performed across a sequence of video frames. In FIGS. 4A and 4B, each number in listing 401 represents the number of text blocks identified within a single frame of a sequence of frames. For example, in FIG. 4A, 2 text blocks were identified in the first frame of the sequence of frames while 5 text blocks were identified in the second frame in that same sequence and so on. Listing 401 may be arranged according to chronological order, e.g., from oldest to most recently recorded frame. Wavelet 403 may be defined based on a specified amount of analysis time. For example, in FIG. 4A wavelet 403 may compare a first 30 seconds of a video sequence with a subsequent 30 seconds of frames. Alternatively, wavelet 403 may compare a previous 3 seconds, 10 seconds, 15 seconds, 45 seconds or 1 minute of frames with an equal number of subsequent frames. Each number of text blocks on the left hand side of wave 403 may be deemed negative while each number of the text blocks on the right hand side may be deemed positive. A difference may then be calculated by summing the numbers on the left hand side and summing the numbers on the right hand side. In the illustrated example of FIG. 4A, the left hand sum results in a value of −32 while the right hand sum results in a value of +46. The left hand sum may then be added to the right hand side to determine a difference (e.g., 14).

This process may be conducted through the entire sequence of extracted frames (e.g., moving the wavelet right by 1 frame each time) and the differences aggregated. For example, FIG. 4B illustrates the analysis of a 1 minute period beginning with the second extracted frame 405. The difference between the left and right hand sides of wavelet 403 may be determined as in FIG. 4A. The boundary of the wavelet may be subsequently moved to a next frame in the sequence and so on until the right boundary of the wavelet reaches the last frame. The maximum difference may then be determined from the aggregated differences (e.g., 14 in FIG. 4A and 16 in FIG. 4B). Between the illustrated examples of FIGS. 4A and 4B, the maximum difference would be 16 (52+−36). The point at which the maximum difference is generated or determined may then be identified as the beginning of the credit roll.

Figure 5:
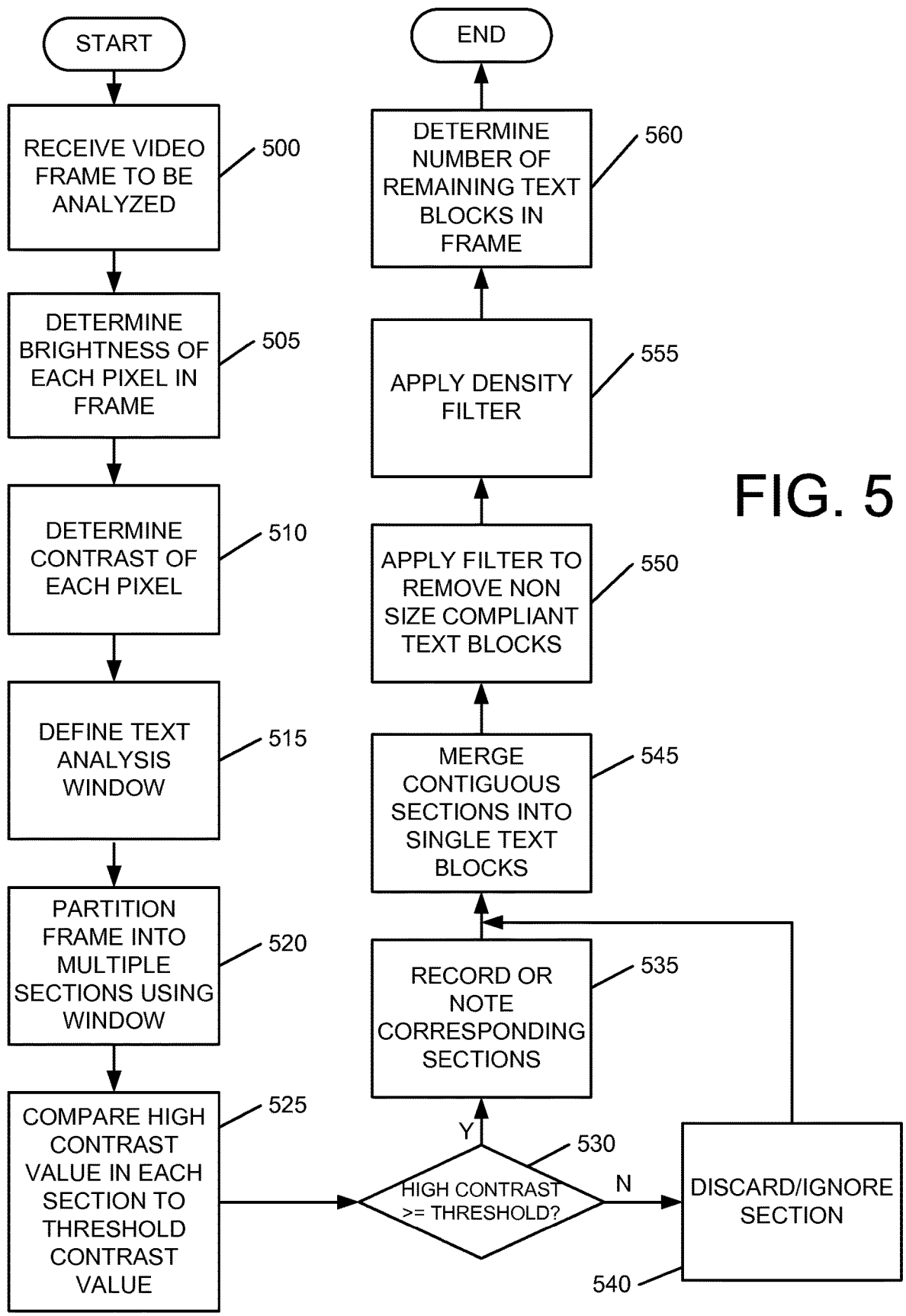
FIG. 5 is a flowchart illustrating an example method by which text blocks may be detected in a video frame according to one or more aspects described herein.

FIG. 5 illustrates a method by which text blocks may be identified within a video frame. The process may rely on the typical practice for text to be displayed in high contrast to surrounding colors and images to facilitate reading. For example, text may be displayed with a brightness or color that is significantly different from the brightness of surrounding images. Accordingly, high contrast areas may be identified in each video frame and identified as a potential text block.

Figure 6A:
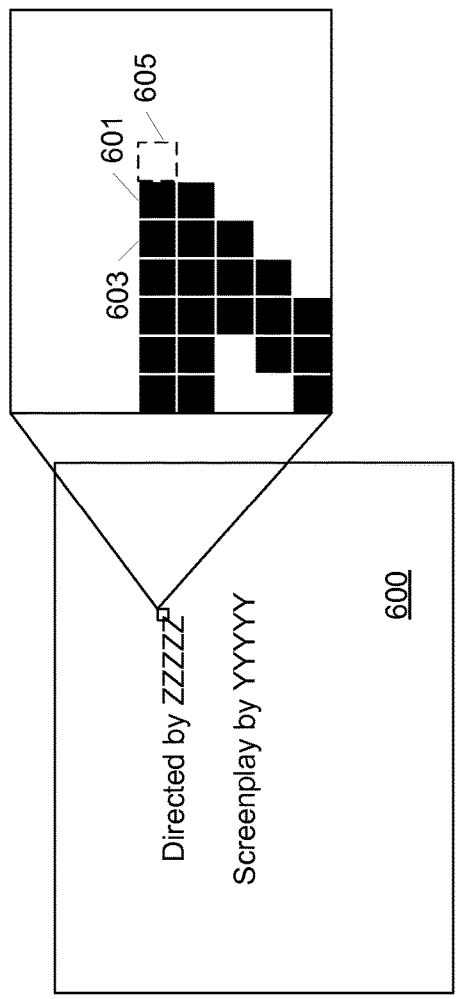
FIGS. 6A & 6B illustrate an example of determining contrast for a video frame pixel according to one or more aspects described herein.
Figure 6B:
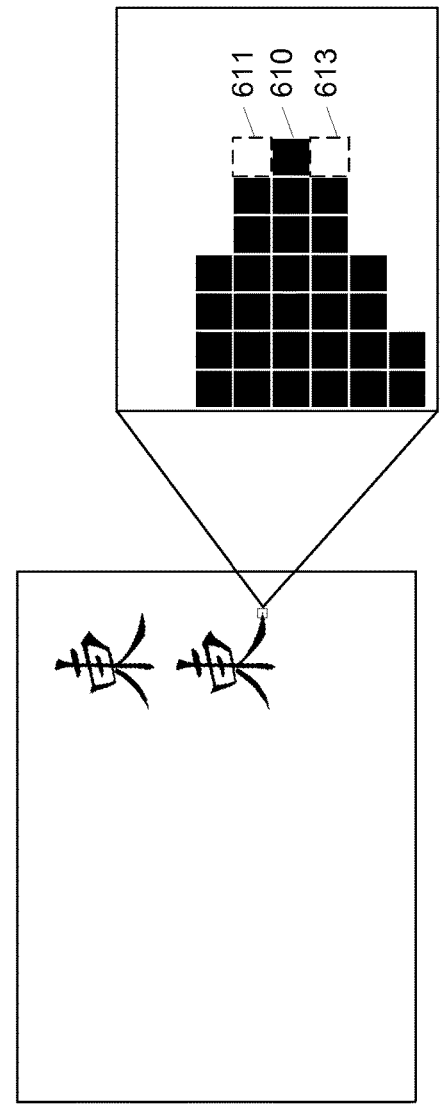

In step 500, a computing system (such as computing system 201 of FIG. 2) may receive a video frame to be analyzed. The video frame may be comprised of multiple pixels, depending on the resolution of the video. For example, 1080p or 1080i video frames may include 1920× 1080 pixels (for videos in 16:9 aspect ratio format). In step 505, the computing system may determine the brightness of each pixel in the frame. The brightness may subsequently be used to determine a contrast of each pixel in step 510. Contrast may be calculated for a current pixel, in one example, by determining a difference in brightness between immediately adjacent pixels. FIGS. 6A and 6B illustrate examples of calculating contrasts for horizontal text and vertical text, respectively. In FIG. 6A, the contrast for a pixel 601 may be calculated by determining the difference in brightness between immediately adjacent left and right pixels 603 and 605, respectively. For example, if pixel 603 has a brightness value of 100 and pixel 605 has a brightness value of 250, the contrast of pixel 601 may be assigned a value of 150. Pixels on the border of frame 600 might not be assigned a contrast value. Alternatively, the border pixels may be assigned a default contrast value such as 0. For vertically progressing languages and text (e.g., Chinese) as shown in FIG. 6B, the contrast for a pixel 610 may be calculated by determining the difference in brightness between immediate adjacent top and bottom pixels 611 and 613, respectively.

Referring again to FIG. 5, in step 515, a text analysis window may be defined by specifying a width and height of the window. The video frame may then be partitioned into multiple sections or blocks according using the text analysis window in step 520. That is, the size of each section or block corresponds to the size of the text analysis window. The sections or blocks may be overlapping or non-overlapping. In either case, each pixel of the video frame may be allocated to a section or block (or multiple sections or blocks). The highest contrast value within each block may then be compared to a threshold contrast value in step 525. If the contrast value meets or exceeds the threshold contrast value as determined in step 530, the area corresponding to that section may be recorded or otherwise noted as a block having text in step 535. Otherwise, the section or block might be discarded in step 540. In step 545, contiguous recorded blocks may be merged into a single text block or section. Contiguous blocks may be overlapping or non-overlapping. For example, two blocks having boundaries that are immediately adjacent to one another may be considered to be contiguous while two blocks overlapping (i.e., sharing pixels) may also be considered contiguous.

The size of the text analysis window (and the partitioned blocks) may be defined based on an expected maximum distance between pixels of characters in a word, sentence, line, paragraph or other textual structure. For example, if the computing system wishes to define a single text block as a horizontal or vertical line of text, the computing system may define the window width or height, respectively, as being equal to the expected maximum distance between characters (or pixels thereof) in a line of text. For example, a window width may be defined as the distance between a top most pixel of the letter "t" and the top most pixel of the letter "J" in the phrase "Directed by Pat. January 2010." In some examples, the width may be greater than the expected maximum distance (e.g., 10%, 20%, 25%, 50%, 75%, 100% greater). The setting of the partition or window size in such a manner may insure that a high contrast pixel is included in every partitioned block within that line of text. Otherwise, areas between characters within the line of text might not be recorded or noted (e.g., if the window size is too small and partitioned areas do not include a sufficiently high contrast pixel). This may then result in the entire line not being aggregated as a single block since the identified areas might not be contiguous due to the non-recorded areas. In another example, if the computing system defines a text block to comprise a single word, the window width or height may be equal to the expected maximum distance between characters in a word and, in some cases, less than an expected minimum distance between words.

Figure 7A:
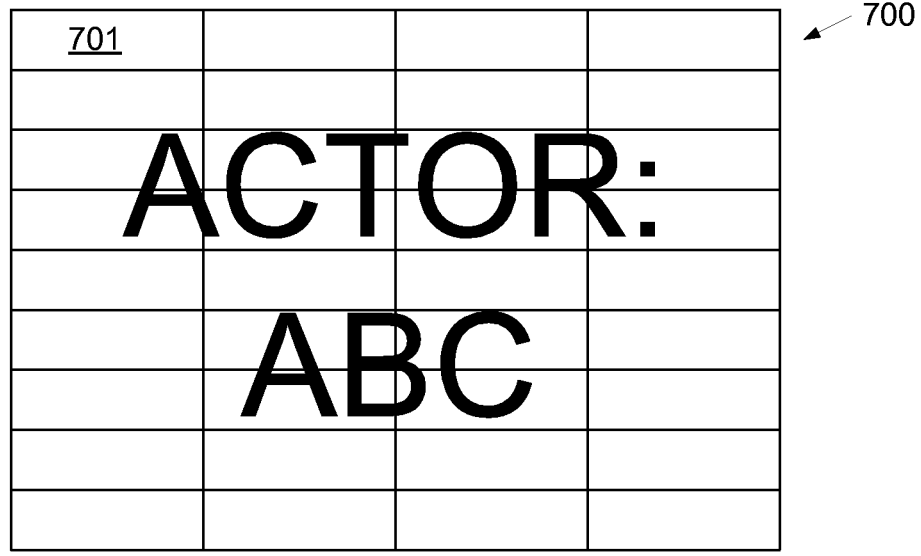
FIGS. 7A-7C illustrate an example process for identifying text blocks according to one or more aspects described herein.
Figure 7B:
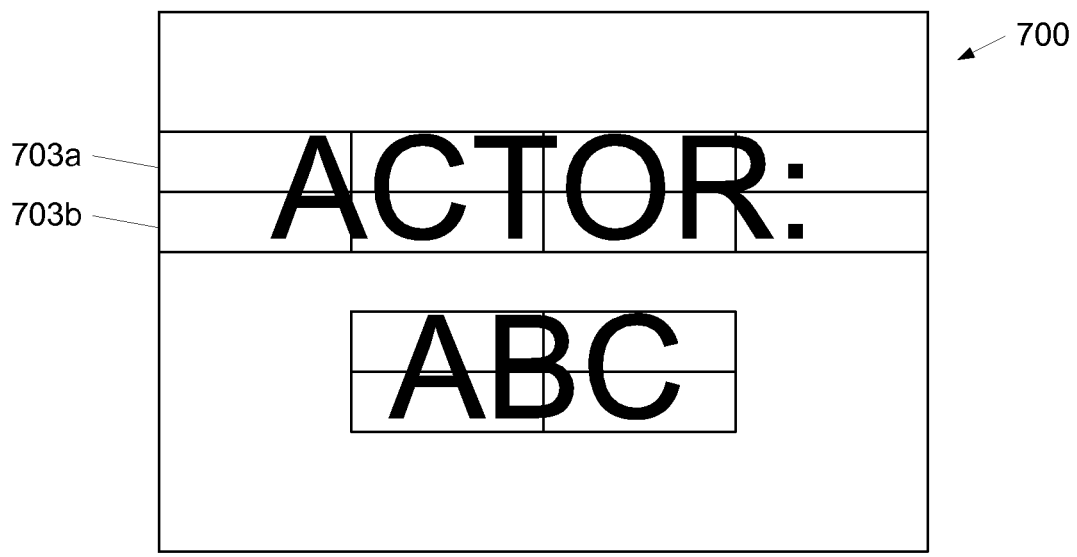
Figure 7C:
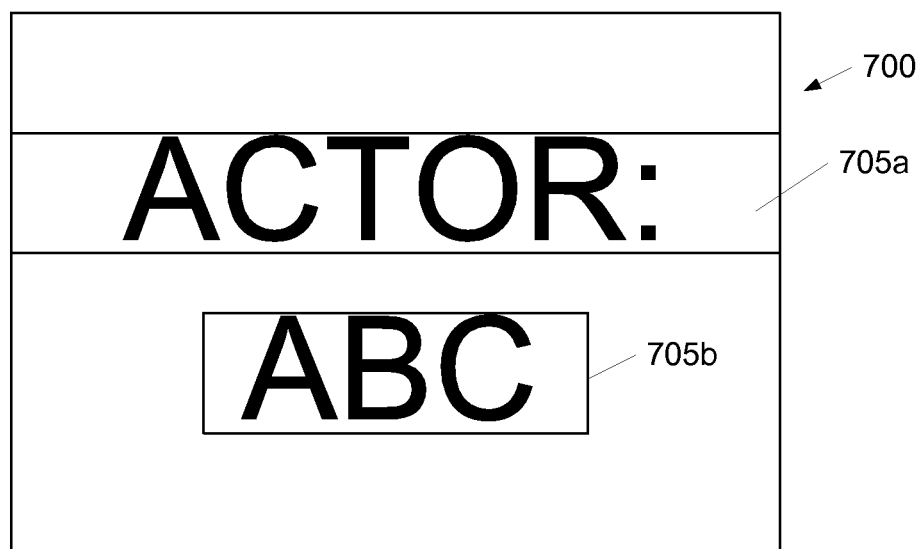

FIGS. 7A-7C illustrates an example use of a text analysis window to partition a video frame into multiple segments or blocks. FIG. 7A, for example, illustrates video frame 700 as partitioned into multiple windows 701 based on a specified text analysis window size. In practice, the partitions may be substantially smaller than illustrated in the example of FIG. 7A. The highest contrast value in each of windows 701 may be identified and compared to a threshold contrast value. Those windows not having a pixel with a contrast meeting the threshold may be discarded while windows meeting the threshold may be recorded. In one example, the contrast threshold may be 60. Other contrast thresholds may be defined depending on preferences and/or content type. FIG. 7B illustrates a representation of video frame 700 once non-matching windows have been discarded and matching windows are retained. In one example, contiguous matching windows, such as windows 703a and 703b may be combined into a single text block. FIG. 7C illustrates a representation of video frame 700 once contiguous recorded windows are merged into single text blocks 705.

Referring back to FIG. 5, once the text blocks have been identified in the video frame, a filter may be applied to the text blocks in step 550 to remove blocks that are not size compliant. Non-size compliant blocks may include those blocks that do not have a minimum required height, width or both. Size requirements may be used to insure that the identified blocks are blocks of text rather than non-text related high contrast pixels. For example, characters in words may have a minimum pixel height depending on the font style and size used. Accordingly, those text blocks having a height of less than 10 pixels, for example, may be filtered out as noise or false positives. False positives may also result from areas that include non-textual images or patterns exhibiting high contrasts. For example, an image of a window on a sunny day may be mis-identified as a text block due to the high contrast between the border of the window and the light shining through the window panes. To remove such false positives, the computing system may further perform a high contrast density filtering process to eliminate such false positives in step 555.

A high contrast density filtering process may examine a high contrast pixel density of each of the identified blocks and compare the density to a threshold density. If the high contrast pixel density does not meet or exceed the threshold density, the corresponding block may be removed as a text block. In one or more examples, the threshold density may be greater than the width of the text block being analyzed divided by the size of the text analysis window. High contrast pixel density may be useful in identifying false positives since text generally exhibits a high frequency of alternating bright and dark spots (e.g., pixels of the character versus pixels of the background). In contrast, a bright window in an image (e.g., sun shining through the window pane), for example, exhibits less frequency in alternating bright and dark spots and thus may exhibit less high contrast areas. That is, while there are transitions at the boundary of the window pane and the window frame or walls adjoining the window, the brightness within the window panes is generally consistent and continuous. Thus, contrast within the window panes may be low and high contrast pixels might only be identified at the points where the window pane ends and the window frame or an adjoining wall begins.

In step 560, the computing system may subsequently determine the number of distinct text blocks identified from the processes of steps 500-550. The computing system may equate the number of distinct text blocks to the number of words, sentences, paragraphs, lines or other text structure in the video frame.

Figure 8:
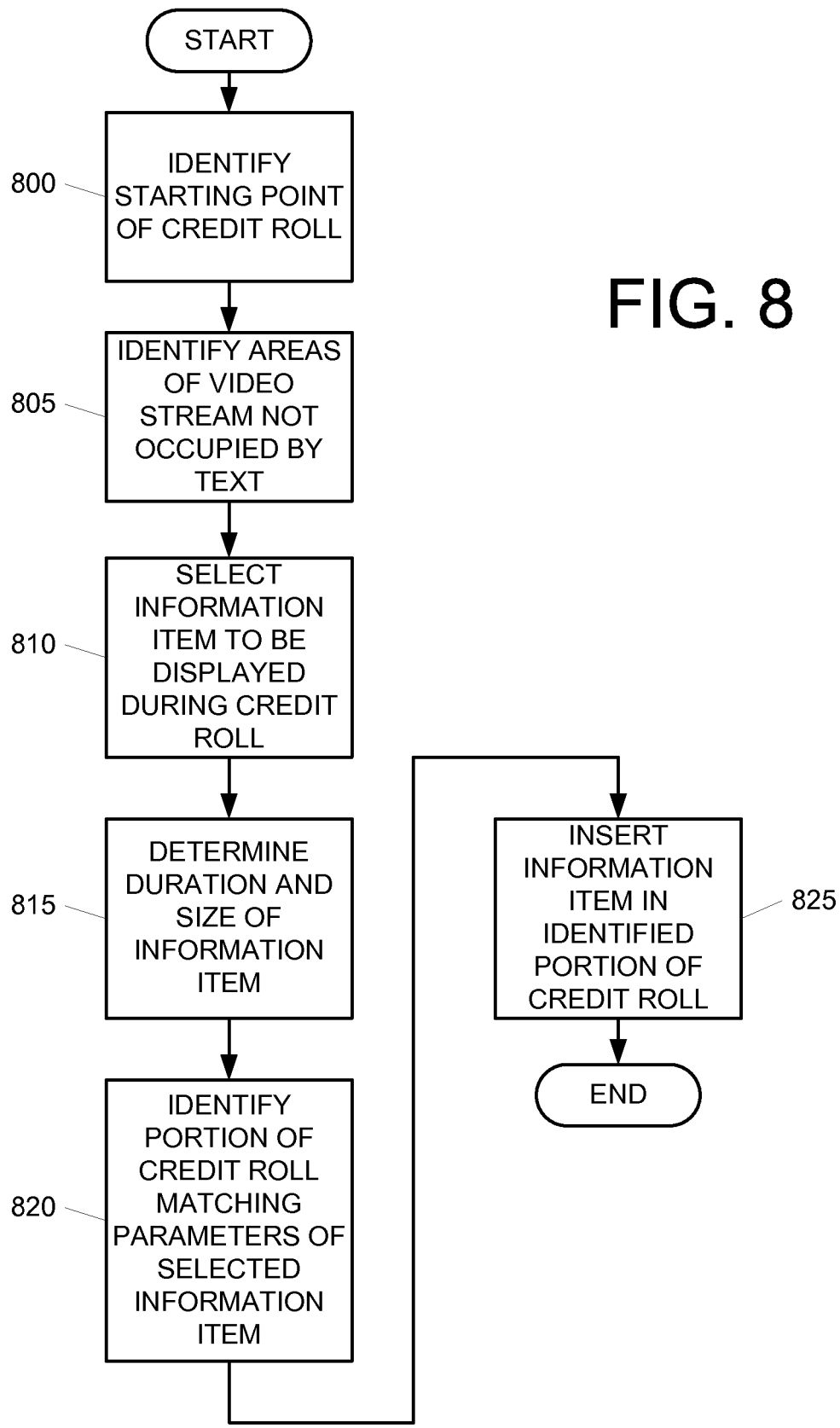
FIG. 8 is a flowchart illustrating an example method for inserting additional content into a portion of a video stream according to one or more aspects described herein.

The detection of the beginning of a credit roll may be used to perform a variety of functions. FIG. 8, for example, illustrates a method for the insertion of content into a credit roll portion of a video stream. In step 800, a computing system may identify the starting point of the credit roll according to the methods and systems described herein. In step 805, the computing system may then identify areas of the video stream that are not occupied by text. This may be performed by analyzing the positions of the identified text blocks and defining the remaining space as unoccupied by text. In step 810, the computing system may select an information item to be displayed during the credit roll. The information item may be a public service announcement, an advertisement such as an interactive advertisement, news, weather, interactive features and/or combinations thereof. In one example, the information item may include a recommendation for another video program. The recommendation may be generated based on a viewer's preferences, profile information (e.g., demographics), viewer's opinion of the current video program and/or combinations thereof. The computing system may further determine a duration and size of the information item in step 815. In some arrangements, the duration may be modified according to a desired duration (e.g., for weather information). The size may also be modified (e.g., shrunk down or expanded as necessary).

In step 820, the computing system may identify a portion of the credit roll of the determined duration that includes consecutive frames having non-text occupied space of the determined size and in the same location throughout the consecutive frames. Consecutive frames may refer to the frames that are extracted and analyzed and not all frames within that portion of the credit roll. For example, a video may comprise 30 frames per second. However, only the extracted and analyzed 2 frames per second (for example) of the identified credit roll portion may be analyzed in step 820. Once identified, the computing system may insert the information item in the identified portion of the credit roll and in the determined location within each frame in step 825. Insertion may occur at a provider's equipment (e.g., at a central office such as a headend or at an edge device closer to the end user) or at the equipment of the end user (e.g., customer premises equipment (CPE)). Insertion of the information item may be performed for all frames for the identified credit roll portion regardless of whether the frame was extracted and analyzed for text blocks. Thus, in the above example where a video stream includes 30 frames per second, the information item may be inserted into all 30 frames per second for the identified credit roll portion.

In some examples, the information item may be selected after identifying portions of a credit roll having consecutive frames exhibiting consistent and continuous areas devoid of text. The size of these textually empty areas and the duration of the identified portion may be determined and used in selecting an appropriate information item. For example, a computing system may identify a segment of a credit roll having a duration of 30 seconds and including an area continuously devoid of text and measuring 100×75 pixels. Accordingly, the computing system may select an advertisement that is able to fit within the determined size and having a duration equal to or less than 30 seconds.

Figure 9:
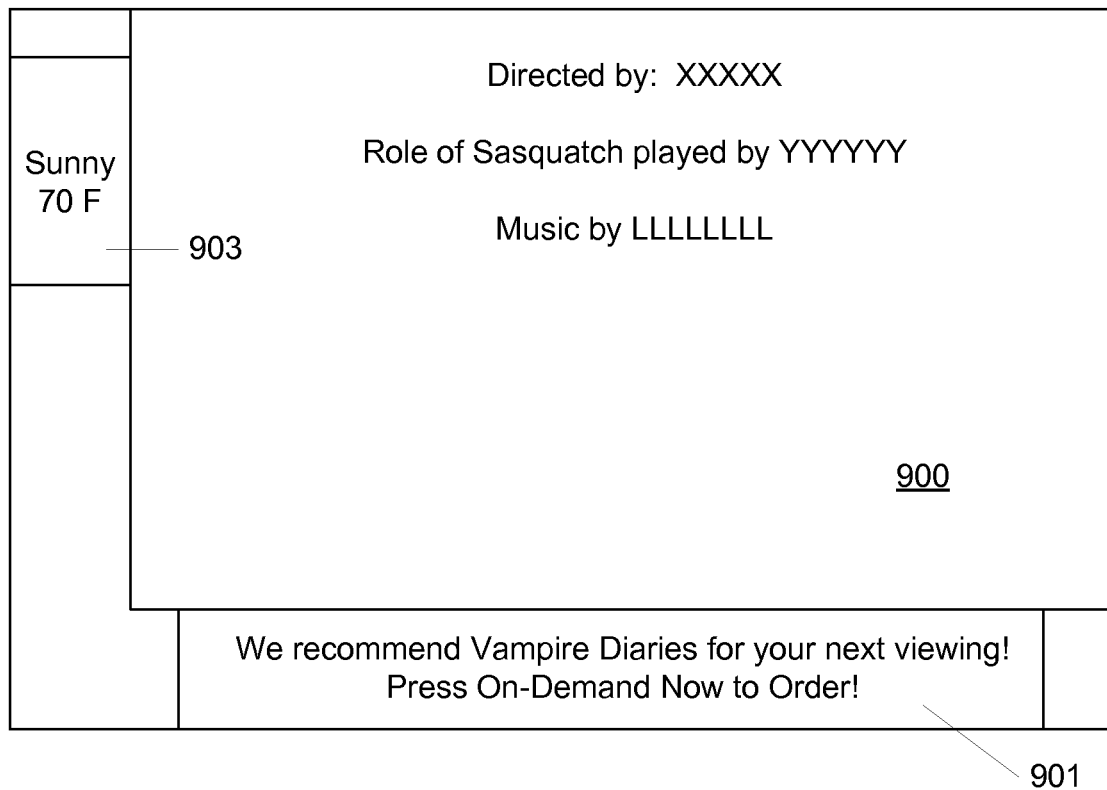
FIG. 9 illustrates an example video frame including inserted additional content according to one or more aspects described herein.

In other examples, once the beginning of a credit roll portion has been identified, the credit roll may be shrunk to a smaller size to allow for placement of advertisements or other content outside of the credit roll boundary. FIG. 9 illustrates an example of a video frame with credit roll 900 shrunk to a smaller size and content recommendation 901 and weather information 903 inserted outside of the shrunken credit roll frame 900.

While many of the aspects described herein have been discussed in relation to credit rolls and the detection thereof, the same features may be applied to detecting the transition a portion of a content item or video stream having substantial amounts of text and a portion of a content item or video stream having fewer or smaller amounts of text.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like. Also, some of the steps in the described methods may be omitted.

Additionally or alternatively, in at least some embodiments, the methods and features recited herein may be implemented through one or more integrated circuits (IC s). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more of the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out various features have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

The invention claimed is:

1. A method comprising:
performing a text detection process on a plurality of images of a video, by comparing a high-contrast pixel density, of each of a plurality of areas of the plurality of images, with a threshold value;
determining, based on the comparing, a first quantity of text-containing areas of a first subset of the plurality of images and a second quantity of text-containing areas of a second subset of the plurality of images;
selecting, based on a difference between the first quantity and the second quantity, a first image of the video;
selecting a first area of the first image; and
modifying the first image at a location that is based on the first area.

2. The method of claim 1, wherein at least one of the text-containing areas of the first subset of the plurality of images has a shape that is based on a text language associated with the video.

3. The method of claim 1, wherein the location is outside the first area.

4. The method of claim 1, wherein the modifying the first image comprises inserting, at the location in the first image, a second image.

5. The method of claim 1, wherein the modifying the first image comprises inserting, at the location in the first image, an interactive information item.

6. The method of claim 1, wherein the modifying the first image comprises inserting a game in the first image at the location.

7. The method of claim 1, wherein the first image comprises a second area that is contiguous in the first image with at least one of the text-containing areas, the method further comprising:
merging the at least one of the text-containing areas with the second area to form a merged area,
wherein the location is outside of the merged area.

8. The method of claim 1, further comprising:
comparing a contrast of each of a plurality of pixels of the first area with a second threshold value; and
determining the high-contrast pixel density of the first area based on the comparing the contrast of each of the plurality of pixels of the first area with the second threshold value.

9. The method of claim 1, wherein a high-contrast pixel density of at least one of the text-containing areas comprises a density of a plurality of high-contrast pixels of the at least one of the text-containing areas, and wherein the plurality of high-contrast pixels of the at least one of the text-containing areas have contrasts exceeding a contrast threshold value.

10. A computing device comprising:
one or more processors; and
memory storing instructions that, when executed by the one or more processors, configure the computing device to:
perform a text detection process on a plurality of images of a video, by comparing a high-contrast pixel density, of each of a plurality of areas of the plurality of images, with a threshold value;
determine, based on the comparing, a first quantity of text-containing areas of a first subset of the plurality of images and a second quantity of text-containing areas of a second subset of the plurality of images;
select, based on a difference between the first quantity and the second quantity, a first image of the video;
select a first area of the first image; and
modify the first image at a location that is based on the first area.

11. The computing device of claim 10, wherein at least one of the text-containing areas of the first subset of the plurality of images has a shape that is based on a text language associated with the video.

12. The computing device of claim 10, wherein the location is outside the first area.

13. The computing device of claim 10, wherein the instructions, when executed by the one or more processors, configure the computing device to modify the first image by inserting, at the location in the first image, a second image.

14. The computing device of claim 10, wherein the instructions, when executed by the one or more processors, configure the computing device to modify the first image by inserting, at the location in the first image, an interactive information item.

15. The computing device of claim 10, wherein the instructions, when executed by the one or more processors, configure the computing device to modify the first image by inserting a game in the first image at the location.

16. The computing device of claim 10, wherein the first image comprises a second area that is contiguous in the first image with at least one of the text-containing areas, and wherein the instructions, when executed by the one or more processors, configure the computing device to merge the at least one of the text-containing areas with the second area to form a merged area, wherein the location is outside of the merged area.

17. The computing device of claim 10, wherein the instructions, when executed by the one or more processors, configure the computing device to:
compare a contrast of each of a plurality of pixels of the first area with a second threshold value; and
determine the high-contrast pixel density of the first area based on the comparing the contrast of each of the plurality of pixels of the first area with the second threshold value.

18. The computing device of claim 10, wherein a high-contrast pixel density of at least one of the text-containing areas comprises a density of a plurality of high-contrast pixels of the at least one of the text-containing areas, and wherein the plurality of high-contrast pixels of the at least one of the text-containing areas have contrasts exceeding a contrast threshold value.

19. One or more non-transitory computer-readable media storing computer-executable instructions that, when executed, cause:
performing a text detection process on a plurality of images of a video, by comparing a high-contrast pixel density, of each of a plurality of areas of the plurality of images, with a threshold value;
determining, based on the comparing, a first quantity of text-containing areas of a first subset of the plurality of images and a second quantity of text-containing areas of a second subset of the plurality of images;
selecting, based on a difference between the first quantity and the second quantity, a first image of the video;
selecting a first area of the first image; and
modifying the first image at a location that is based on the first area.

20. The one or more non-transitory computer-readable media of claim 19, wherein at least one of the text-containing areas of the first subset of the plurality of images has a shape that is based on a text language associated with the video.

21. The one or more non-transitory computer-readable media of claim 19, wherein the location is outside the first area.

22. The one or more non-transitory computer-readable media of claim 19, wherein the instructions, when executed, cause the modifying the first image by causing inserting, at the location in the first image, a second image.

23. The one or more non-transitory computer-readable media of claim 19, wherein the instructions, when executed, cause the modifying the first image by causing inserting, at the location in the first image, an interactive information item.

24. The one or more non-transitory computer-readable media of claim 19, wherein the instructions, when executed, cause the modifying the first image by causing inserting a game in the first image at the location.

25. The one or more non-transitory computer-readable media of claim 19, wherein the first image comprises a second area that is contiguous in the first image with at least one of the text-containing areas, and wherein the instructions, when executed, cause merging the at least one of the text-containing areas with the second area to form a merged area, wherein the location is outside of the merged area.

26. The one or more non-transitory computer-readable media of claim 19, wherein the instructions, when executed, further cause:
comparing a contrast of each of a plurality of pixels of the first area with a second threshold value; and
determining the high-contrast pixel density of the first area based on the comparing the contrast of each of the plurality of pixels of the first area with the second threshold value.

27. The one or more non-transitory computer-readable media of claim 19, wherein a high-contrast pixel density of at least one of the text-containing areas comprises a density of a plurality of high-contrast pixels of the at least one of the text-containing areas, and wherein the plurality of high-contrast pixels of the at least one of the text-containing areas have contrasts exceeding a contrast threshold value.

28. A system comprising:
a computing device and a display device,
wherein the computing device is configured to:
perform a text detection process on a plurality of images of a video, by comparing a high-contrast pixel density, of each of a plurality of areas of the plurality of images, with a threshold value;
determine, based on the comparing, a first quantity of text-containing areas of a first subset of the plurality of images and a second quantity of text-containing areas of a second subset of the plurality of images;
select, based on a difference between the first quantity and the second quantity, a first image of the video;
select a first area of the first image; and
modify the first image at a location that is based on the first area, and
wherein the display device is configured to output the modified first image.

29. The system of claim 28, wherein at least one of the text-containing areas of the first subset of the plurality of images has a shape that is based on a text language associated with the video.

30. The system of claim 28, wherein the location is outside the first area.

31. The system of claim 28, wherein the computing device is configured to modify the first image by inserting, at the location in the first image, a second image.

32. The system of claim 28, wherein the computing device is configured to modify the first image by inserting, at the location in the first image, an interactive information item.

33. The system of claim 28, wherein the computing device is configured to modify the first image by inserting a game in the first image at the location.

34. The system of claim 28, wherein the first image comprises a second area that is contiguous in the first image with at least one of the text-containing areas, and wherein the computing device is configured to merge the at least one of the text-containing areas with the second area to form a merged area, wherein the location is outside of the merged area.

35. The system of claim 28, wherein the computing device is configured to:
compare a contrast of each of a plurality of pixels of the first area with a second threshold value; and
determine the high-contrast pixel density of the first area based on the comparing the contrast of each of the plurality of pixels of the first area with the second threshold value.

36. The system of claim 28, wherein a high-contrast pixel density of at least one of the text-containing areas comprises a density of a plurality of high-contrast pixels of the at least one of the text-containing areas, and wherein the plurality of high-contrast pixels of the at least one of the text-containing areas have contrasts exceeding a contrast threshold value.

37. A method comprising:
performing a credit roll detection process on a video, wherein the video comprises a plurality of video frames, the credit roll detection process comprising:
comparing high-contrast pixel densities of a plurality of areas of the plurality of video frames with a threshold value;
determining, based on the comparing, a first quantity of text-containing areas of a first subset of the plurality of video frames and a second quantity of text-containing areas of a second subset of the plurality of video frames;
selecting, based on a difference between the first quantity and the second quantity, a first area of a first video frame from the plurality of areas of the plurality of video frames; and
based on the first area being selected, modifying the video.

38. The method of claim 37, wherein at least one of the plurality of areas has a shape that is based on a text language associated with the video.

39. The method of claim 37, wherein the modifying the video comprises modifying the first area of the first video frame.

40. The method of claim 39, wherein the modifying the video comprises inserting an interactive information item.

41. A computing device comprising:
one or more processors; and
memory storing instructions that, when executed by the one or more processors, configure the computing device to:
perform a credit roll detection process on a video, wherein the video comprises a plurality of video frames, and the credit roll detection process comprises:
comparing high-contrast pixel densities of a plurality of areas of the plurality of video frames with a threshold value;
determining, based on the comparing, a first quantity of text-containing areas of a first subset of the plurality of video frames and a second quantity of text-containing areas of a second subset of the plurality of video frames;
selecting, based on a difference between the first quantity and the second quantity, a first area of a first video frame from the plurality of areas of the plurality of video frames; and
based on the first area being selected, modifying the video.

42. The computing device of claim 41, wherein at least one of the plurality of areas has a shape that is based on a text language associated with the video.

43. The computing device of claim 41, wherein the instructions, when executed by the one or more processors, configure the computing device to modify the video by modifying the first area of the first video frame.

44. The computing device of claim 41, wherein the instructions, when executed by the one or more processors, configure the computing device to modify the video by inserting an interactive information item.

45. One or more non-transitory computer-readable media storing computer-executable instructions that, when executed, cause:
performing a credit roll detection process on a video, wherein the video comprises a plurality of video frames, and the credit roll detection process comprises:
comparing high-contrast pixel densities of a plurality of areas of the plurality of video frames with a threshold value;
determining, based on the comparing, a first quantity of text-containing areas of a first subset of the plurality of video frames and a second quantity of text-containing areas of a second subset of the plurality of video frames;
selecting, based on a difference between the first quantity and the second quantity, a first area of a first video frame from the plurality of areas of the plurality of video frames; and
based on the first area being selected, modifying the video.

46. The one or more non-transitory computer-readable media of claim 45, wherein at least one of the plurality of areas has a shape that is based on a text language associated with the video.

47. The one or more non-transitory computer-readable media of claim 45, wherein the instructions, when executed, cause the modifying the video by causing modifying the first area of the first video frame.

48. The one or more non-transitory computer-readable media of claim 45, wherein the instructions, when executed, cause the modifying the video by causing inserting an interactive information item.

49. A system comprising:
a computing device and a display device,
wherein the computing device is configured to:
perform a credit roll detection process on a video, wherein the video comprises a plurality of video frames, and the credit roll detection process comprises:
comparing high-contrast pixel densities of a plurality of areas of the plurality of video frames with a threshold value;
determining, based on the comparing, a first quantity of text-containing areas of a first subset of the plurality of video frames and a second quantity of text-containing areas of a second subset of the plurality of video frames;
selecting, based on a difference between the first quantity and the second quantity, a first area of a first video frame from the plurality of areas of the plurality of video frames; and
based on the first area being selected, modifying the video, and
wherein the display device is configured to output the modified video.

50. The system of claim 49, wherein at least one of the plurality of areas has a shape that is based on a text language associated with the video.

51. The system of claim 49, wherein the computing device is configured to modify the video by modifying the first area of the first video frame.

52. The system of claim 49, wherein the computing device is configured to modify the video by inserting an interactive information item.

* * * * *